Oct. 12, 1971   J. R. SCHIRTZINGER ET AL   3,611,463
TAPPED HOLE CHECKING DEVICE

Filed June 12, 1969   2 Sheets-Sheet 1

INVENTORS.
John R. Schirtzinger, &
BY Arthur H. Schorr

Herbert Furman
ATTORNEY

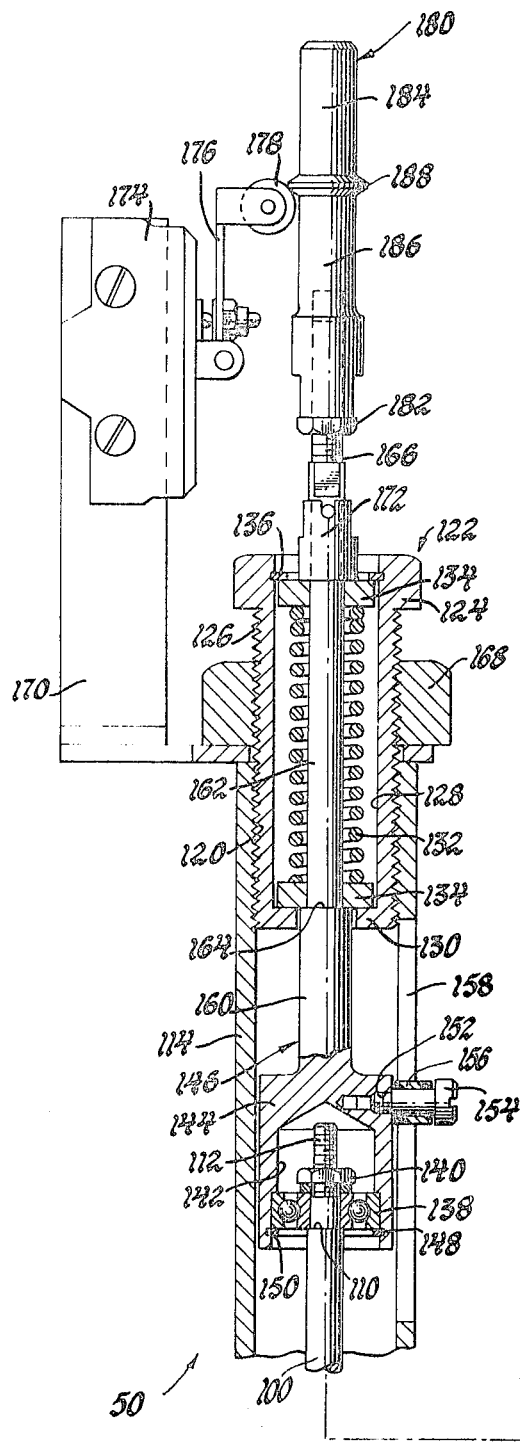
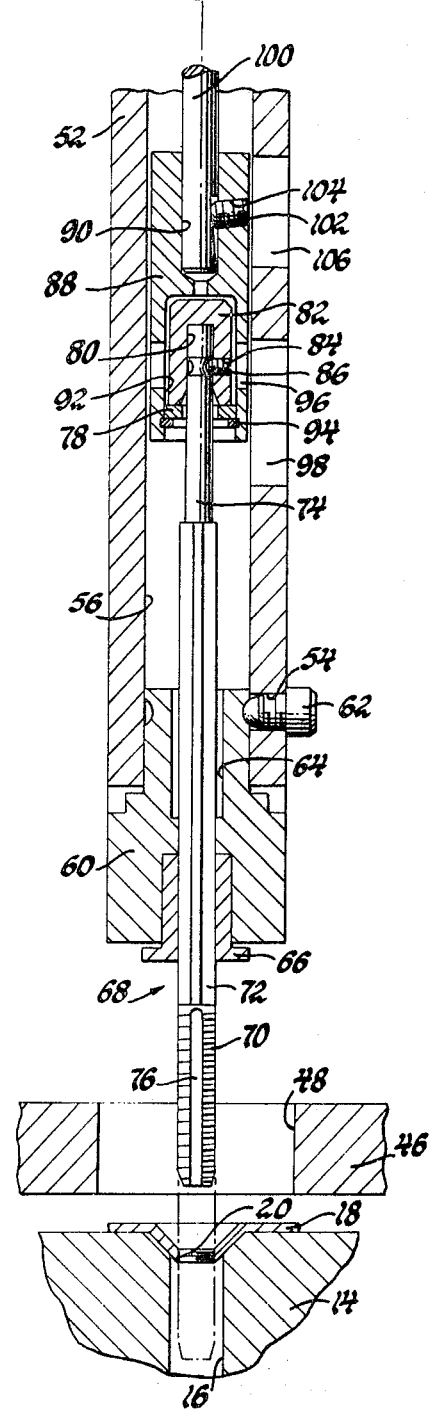
Fig. 2

United States Patent Office 3,611,463
Patented Oct. 12, 1971

3,611,463
TAPPED HOLE CHECKING DEVICE
John R. Schirtzinger and Arthur H. Schorr, Columbus, Ohio, assignors to General Motors Corporation, Detroit, Mich.
Filed June 12, 1969, Ser. No. 832,791
Int. Cl. B23g *1/00;* G01b *3/40, 3/48, 5/16*
U.S. Cl. 10—129                                  4 Claims

ABSTRACT OF THE DISCLOSURE

A tapped hole checking device has a rotatably driven spindle mounted on a vertically reciprocating tapping head of a tapping machine. A torque clutch on the lower end of the spindle mounts a probe with a threaded end, permitting the probe to be moved vertically. The probe is connected to a cam which responds to relative motion between the probe and the head to operate a switch mounted on the head. As the head lowers, the threaded end of the rotating probe engages and screws into a tapped hole at a rate faster than the head lowers to produce a relative motion between the head and the probe and close the switch. As the head raises, the rotation of the probe reverses to screw out of the tapped hole, again closing the switch, If during this cycle, the probe encounters a defectively tapped hole of any kind, it fails to close the switch both times and the machine shuts off.

---

Figure 2:
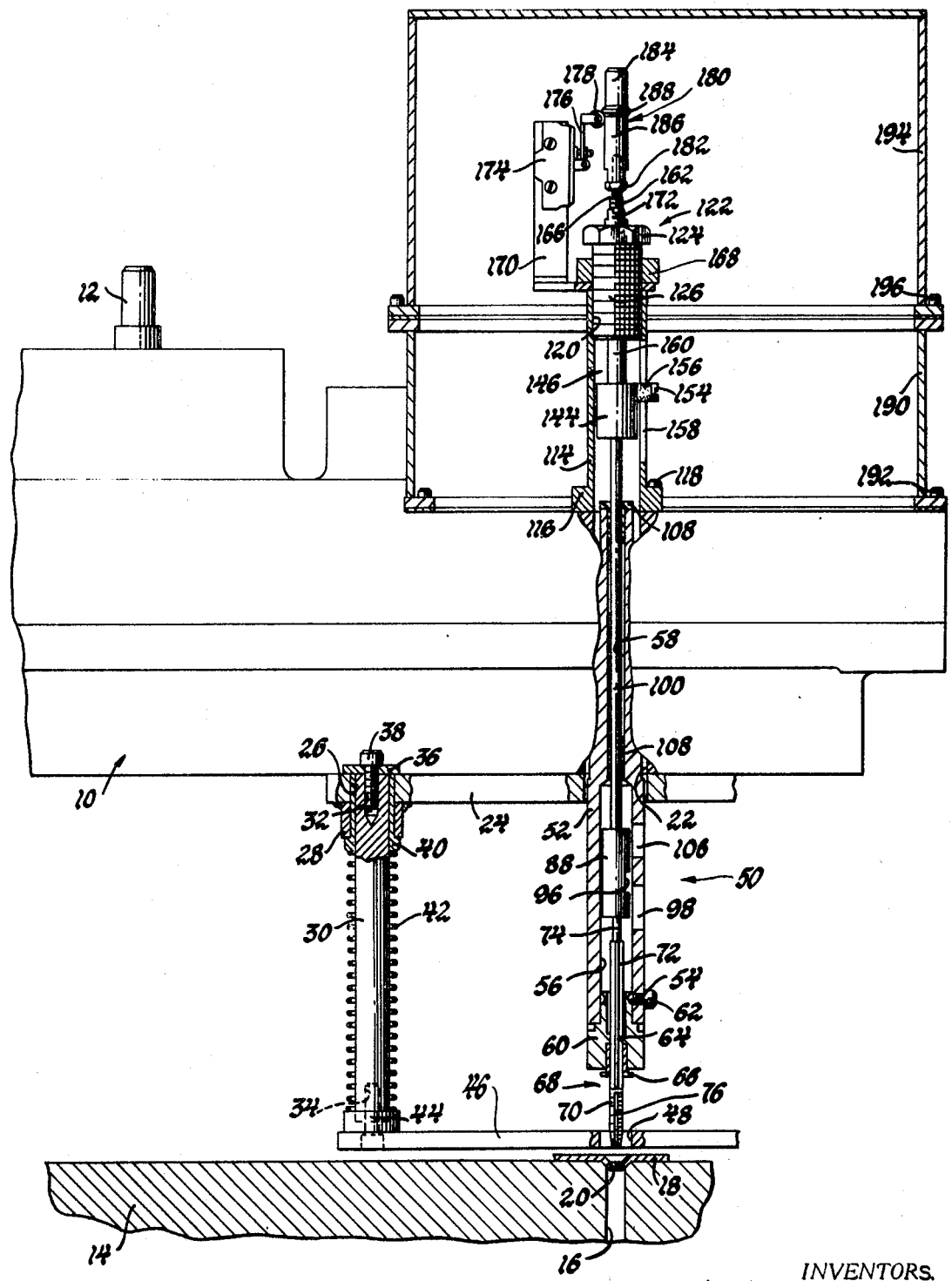

This invention relates to devices for checking tapped holes and more particularly to a device for automatically checking tapped holes.

American industry produces millions of tapped holes and most of these holes are either in high-production low-unit value items where checking each tapped hole is not economically feasible or in limited-production high-unit value items where each tapped hole must be checked for tapping and thread tolerance. This is usually done manually by go-no go gages.

However, there is also the situation where each tapped hole of a high-production low-unit value part should be checked before this one part is assembled with other parts to form a high value item. In the past these holes have been automatically tapped, visually inspected and a statistical sample of the parts checked for properly threaded holes. However, it is possible for the one part with an improperly tapped hole to slip by the inspection procedure and to be assembled with other parts to form the high value item. Oftentimes, the other parts assembled to the one part block the access to the tapped holes to prevent further checking for or retapping of defectively tapped holes. Thus the item must be scrapped.

What is needed then is an automated 100 percent inspection of the tapped holes in the part right after the tapping operation, if possible, where it is feasible to correct both the tapping machine that produced the defectively tapped hole and the tapped hole itself before subsequent work is done on the part.

The tapped hole checking device of this invention in the preferred embodiment adds a checking station to a conventional tapping machine with a tapping head so that the machine both taps the holes and then immediately checks the tapped hole. The checking device includes a probe mounted in a torque clutch on a spindle which is rotatively driven by the tapping head. The rotating probe has a threaded end which engages a tapped hole in a part as the tapping head is lowered. The probe is pulled down relative the head by the threaded end screwing into the properly tapped hole, pulling a lobed cam down with it so that the lobe on the cam closes a switch on the machine permitting the machine to reverse the tapping head at the end of the cycle. As the tapping head is reversed, the probe reverses rotation to screw out of the hole, pushing the cam upwardly so that the lobe again closes the switch permitting the machine to commence a new cycle. If the probe finds no hole, the cam is driven upwardly by the lowering of the tapping head, moving the switch away from the lobe, so that the switch is never closed, and the tapping machine is shut-off. If the probe finds a hole with threads that are too tight, the torque clutch slips, halting the rotation of the probe and its downward movement to likewise eventually shut-off the machine. Also if too large a hole is found, the probe never engages the threads and is not pulled down such that the machine eventually shuts-off.

Therefore it is an object of this invention to provide a tapped hole checking device which automatically checks a tapped hole in a part. It is a further object of this invention to provide such a device including a rotating probe having a threaded end which screws into a tapped hole to produce a relative movement therebetween. It is yet a further object of this invention to provide such a device where the relative movement between the threaded probe and the hole operates an indicator showing that the hole is correctly tapped.

It is another object of this invention to provide a tapped hole checking device which mounts on the tapping head of a tapping machine and includes a rotating probe with a threaded end which screws into a tapped hole to cause a relative motion therebetween which is different from the relative motion between the head and the hole, with this motion controlling the operation of the machine. It is yet another object of this invention to provide such a device mounted on such a machine which shuts-off the machine and indicates where a defectively tapped hole of any type is located.

These and other objects of this invention will become apparent from the following detailed description and drawings in which:

FIG. 1 is a partially cut-away view of a portion of a tapping machine with the tapping head having mounted therein a tapped hole checking device, according to this invention, with both the tapping head and the checking device shown in the ready position and the probe thereof poised to check a tapped hole in a part; and FIG. 2 is an enlarged fragmented sectional view of portions of FIG. 1 showing certain details of the construction of the tapped hole checking device.

Referring to FIGS. 1 and 2 but particularly FIG. 1, the portion of the conventional tapping machine shown includes a conventional tapping head 10 having a tapping spindle 12 which attaches to the machine to rotatively drive the gearing inside the tapping head and further includes a multiple position indexing table 14 for supporting and positioning parts such as lock frames with chamfered relief holes 16 within the indexing table for receiving the taps (not shown). The embossments of the lock frames 18 are positioned within the relief holes 16 on the indexing table 14 with the holes 20 to be tapped in the frame 18 aligned with the relief holes 16. The layout of the table 14 is such that it can accept several lock frames at once either of the right or left hand design. In the tapping operation of the tapping machines the tapping head 10 moves vertically from the ready position shown in FIG. 1, downwardly through an intermediate position to a lowered position at a rate of speed which corresponds to the rate of descent of the taps into the holes to be tapped at the particular speed of their rotation i.e. if the tap speed for a ¼″ tap is 920 r.p.m., the head speed would be 46 inches per minute. When the taps are reversed to screw out of the hole, the head 10 rises, returning to the ready position of FIG. 1. When the tapping head 10 is in the ready position of FIG. 1, the indexing table 14 moves to a different position bringing a new set of lock frames 18 under the taps and then the head 10 repeats the tapping operation.

The tapping head 10 also has a series of spindle holes 22 extending from the upper surface thereof through the head 10 to the lower surface. The spindle holes 22 are coaxial with the relief holes 16 in the table 14. On the bottom of the tapping head 10 is a bracket 24 having a series of guide holes 26 through respective bosses 28 on the underside of bracket 24 and a series of holes through bracket 24 which form a continuation of the spindle holes 22.

Inserted through each guide hole 26 is a guide pin 30 having tapped axial holes 32 and 34 in its upper and lower end, respectively. The guide pin 30 is maintained within hole 26 in bracket 24 by a stop washer 36 of a diameter larger than the diameter of the hole 26 and is secured to the top of guide pin 30 by cap screw 38 in hole 32. The guide pin 30 also has therearound a flanged guide bushing 40 which is inserted into hole 26 with the flange thereof engaging the underside of boss 28. The lower end of guide bushing 40 seats the upper end of a compression spring 42. The lower end of compression spring 42 seats against a boss 44 on a pressure pad 46 which is secured to the lower end of the guide pin 30 by a capscrew in hole 34. The pressure pad 46 has a relief hole 48 therethrough for each spindle hole 22 which is coaxial therewith for a purpose which will appear later.

As previously explained, the tapping head 10 is lowered during the tapping operation and, as the head 10 lowers, the pressure pad 46 also lowers until it engages the top of a lock frame 18, placed on the indexing table 14 for tapping, and presses it against the table 14. As the head 10 continues down, the guide bushing 40 is driven down by the head 10 to compress spring 42 and exert pressure on the lock frame 18 to hold it in place on the table 14 while it is being worked on. Once the work is complete, the head 10 rises with the compression spring 42 maintaining the lock frame 18 under pressure until the stop washer 36 limits the sliding movement of the guide pin 30 relative to the head 10. Once the bracket 24 engages the stop washer 36, the continued upward movement of the head lifts the pressure pad 46 from the lock frame 18 and the table 14 enabling both to move to the next position.

In the preferred embodiment, a tapped hole checking device, according to this invention and generally denoted by the number 50, is mounted to the head 10 in each spindle hole 22. As each tapped hole checking device 50 is the same except for its location, only one will be particularly described and the description is equally applicable to the others.

The tapped hole checking device 50 includes a hollow cylindrical spindle 52 rotatably mounted within the spindle hole 22 by a spaced pair of conventional ball bearings (not shown). The spindle 52 also has a gear (not shown) thereon which meshes with the gearing in the tapping head 10 to rotatively drive the spindle 52 at a speed twice the speed of the taps, i.e. for a tap speed of 920 r.p.m., the spindle speed would be 1840 r.p.m. The spindle 52 extends downwardly from the lower surface of the head 10 and has a tapped hole 54 adjacent its lower end. The spindle 52 has a large diameter axial cylindrical cavity 56 extending upwardly from the lower end thereof to a point midway of the spindle 52 where it meets with a small diameter axial cylindrical cavity 58 from the upper end of the spindle 52.

A torque clutch 60 is inserted into the lower end of spindle 52 and is maintained in position by a capscrew 62 in the tapped hole 54. The torque clutch 60 has an axial aperture 64 with a square cross section for receiving a square shank to be rotatively driven while also allowing vertical movement of the shank. A bushing 66 also with a square cross section aperture is mounted to the torque clutch 60 just below the aperture 64. The combined length of the spindle 52, the torque clutch 60 and the bushing 66 below the bottom surface of the head 10 is less than the closest distance between the bottom surface of the head 10 and the upper surface of pressure pad 46 at any time during the operation of the tapping machine so that there is no interference between the bushing 66 and the pressure pad 46.

A probe 68 has a threaded lower end 70, a square cross section shank 72 and a tubular upper end 74. The threads of the end 70 are slightly undersize i.e., .010 in pitch diameter from the tap threads and the probe 68 is tapered at the bottom to facilitate easy threading into a tapped hole. The probe 64 has a series of axial flutes 76 approximately .090″ wide and .050″ deep extending from the lower tip through the threads of end 70 to provide escape routes for any chips that may be left in the tapped hole from the tapping operation and thereby prevent them from binding up the probe 68.

The square cross section shank 72 is several inches long so that when inserted into the aperture 64 of the torque clutch 60 it can slide vertically and yet maintain a driving connection therebetween throughout its entire vertical movement. When the probe 68 is inserted into the torque clutch 60 through aperture 64, rotation of the torque clutch 60 by the spindle 52 rotates the probe 68. The torque clutch 60 is set at a light setting such as 55 inch lbs. so that if the probe 68 encounters an obstruction which holds the probe 68, the clutch 60 will slip permitting the spindle 52 to continue rotating without harming the tapped hole or the probe 68.

As best seen in FIG. 2, the upper end 74 of the probe 68 extends upwardly from the torque clutch 60 to a position just below the center of the lower cylindrical cavity 56 of the spindle 52. The upper end 74 extends through washer 78 and into the center cavity 80 of a floating retainer 82. The floating retainer 82 is cylindrical in shape and has a tapped hole 84 therein into which is screwed a set screw 86 to secure the retainer 82 and the upper end 74 of probe 68 together.

A cylindrical holder 88 within cavity 56 of spindle 52 has an upper cylindrical cavity 90 and a lower cylindrical cavity 92 in which the retainer 82 is inserted. The retainer 82 rests on the washer 78 also in the cavity 92 and is retained therein by a snap ring 94 in a groove adjacent the lower end of the holder 88. The holder 88 also has an axial slot 96 adjacent the lower end and the spindle 52 has a longitudinal slot 98 therethrough to provide access to the set screw 86 enabling the probe 68 to be easily replaced. The use of the floating retainer 82 enables the probe 68 to be rotated without necessarily rotating the holder 88 and yet insures that the holder 88 follows the downward movement of the probe 68. The tubular holder 88 is so positioned in cavity 56 that it has several inches of travel upwardly or downwardly before engaging either the upper end of cavity 56 of spindle 52 or the upper end of the torque clutch 60.

As seen in FIG. 1, a long connecting shaft 100 has its lower end inserted into upper cylindrical cavity 90 of holder 88 and secured thereto by a set screw 102 through a tapped hole 104 adjacent the upper end of the holder 88. Here also, the spindle 52 has a longitudinal slot 106 to provide outside access to the set screw 102.

The connecting shaft 100 extends upwardly through the cavity 58 in the spindle 52 and rises several inches above the upper surface of the tapping head 10. The shaft 100 is maintained radially of the cavity 58 by a spaced pair of hollow nylon guides 108, one of each end of cavity 58. The upper end of shaft 100 has a shoulder 110 and a threaded end 112 extending therefrom.

The upper end of shaft 100 while rising above the tapping head 10 does not stick out because of a hollow tubular support housing 114. The housing 114 has apertured flanges 116 on the lower end thereof enabling the housing 114 to be bolted at 118 to the tapping head 10 with the centerline of the housing 114 coaxial with the centerline of spindle holes 22. The bore of housing 114 is of a greater diameter than the spindle hole 22 and forms an enlarged continuation of it. The upper end of the housing 114 is internally threaded at 120 to receive an externally threaded tubular adjuster assembly 122.

As best seen in FIG. 2, the adjuster assembly 122 includes an upper hexagon nut portion 124 and an externally threaded tubular lower portion 126 with a central longitudinal cylindrical cavity 128 terminated by an inwardly extending apertured lip 130 at the lower end thereof. A compression spring 132 is contained in the cavity 128, seating at its upper and lower ends on washers 134 retained by a snap ring 136 in a groove adjacent the upper end of the cavity 128 and by the lip 130, respectively.

Returning to the upper end of connecting shaft 100, it protrudes upwardly into the hollow of housing 114 almost to the midpoint thereof where the upper end of shaft 100 extends through a ball bearing 138. The shaft 100 is secured to the ball bearing 138 by a nut 140 on the threaded end 112. The ball bearing 138 is located in a cylindrical cavity 142 in the cylindrical lower portion 144 of a spring shaft 146 and is secured by a snap ring 148 in groove 150 adjacent the lower end of cavity 142.

The cylindrical lower portion 144 of the spring shaft 142 also has a tapped hole 152 into which is screwed a shoulder screw 154 with a nylon bushing 156 therearound. The screw 154 extends through a longitudinal slot 158 in housing 114 with the bushing 156 engaging the sides of the slot 158 to prevent rotation of the spring shaft 146 and yet allow up and down movement thereof. The ball bearing 138, of course, facilitates the attachment of the non-rotatable spring shaft 146 to the rotatable connecting shaft 100.

The spring shaft 146 has an intermediate rod portion 160, of a diameter less than the apertured lip 130 hole diameter but greater than the washer 134 hole diameter, extending upwardly from the lower portion 144, and an upper rod portion 162 of a diameter smaller than the washer 134 hole diameter extend upwardly from the intermediate rod portion 160. The juncture between the two rod portions 160 and 162 forms a shoulder 164 for a purpose which will appear shortly. The upper end of rod portion 162 extends above the housing 114 and has threads 166 therealong for several inches.

A lock nut 168 is threaded onto the adjuster assembly 122 and an L-shaped switch support bracket 170 is placed upon the top of the housing 114 prior to the adjuster assembly 122 being slid over the upper rod portion 162 of spring shaft 146 and screwed into the internal threads 120. The adjuster assembly 122 is screwed down until the lower washer 134 seats against shoulder 164 of the spring shaft 146 and then further down until the lower cylindrical portion 144 thereof is centrally located between the ends of the housing 114. The lock nut 168 is then screwed down to secure the bracket 170 to the housing 114 and to maintain the adjuster assembly 122 in the proper location. Another lock nut 172 of a diameter less than the cavity 128 but greater than the diameter of the hole in the washer 134 is screwed onto threads 166 of the upper rod portion 162 of spring shaft 146 until it engages upper washer 134. Thus the spring 132 will tend to return the spring shaft 146 and the other parts attached thereto to the central location shown in FIG. 1 if moved either upwardly or downwardly.

The support bracket 170 mounts a micro switch 174 having a switch lever 176 pivotally mounted at one end thereon. The other end of lever 176 mounts a wheel 178 to act as a cam follower.

A cam 180 is screwed on the threads 166 of the upper rod portion 162 of spring shaft 146 after a lock nut 182 has been screwed on. The cam 180 is generally cylindrically shaped with upper and lower cylindrical portions 184 and 186 respectively separated by a raised lobe 188. The wheel 178 of lever 176 rides on the cam 180 with the switch 174 being open when the wheel 180 is on either the upper or lower cylindrical portion 184 or 186 and closed when the wheel 178 is on the lobe 188. The switch 174 is in a relay circuit in the tapping machine controls and must be closed for an instant sometime during the lowering of head 10 and also during the raising of head 10. The cam 180 is turned to the proper location to correctly position the lobe 188 and is maintained in this position by lock nut 182. If the switch 174 is not closed during each of these movements, i.e. twice during each cycle, the tapping machine will shut off when the cycle is completed and will not start the next cycle. Also the switch 174 is wired to a panel (not shown) which will indicate that the switch 174 has not been closed properly.

As best seen in FIG. 1, the upper end of tapped hole checking device 50 is surrounded by a lower shield 190 bolted at 192 to the upper surface of tapping head 10. An enclosed upper shield 194 is likewise bolted at 196 to lower shield 190 to completely enclose the mechanism of the tapped hole checking device 50 and yet provide easy access thereto for repair or adjustment.

The tapped hole checking device 50 operates simultaneously with the tapping operation, but at a different position of the table 14. As previously explained, in the tapping operation the head 10 starts from the ready position of FIG. 1 and moves downwardly. As the head 10 descends, the gearing inside rotatively drives the spindle 52 and, through the torque clutch 60, the probe 68 in the proper direction at a speed twice the tap speed i.e. about 1840 r.p.m. if the tap speed is 920 r.p.m.

The rotation of the probe 68 rotates the floating retainer 82. The floating retainer 82 is free to rotate relative the holder 88, but the holder 88 and the connecting shaft 100 normally rotate together because of the friction between the retainer 82 and the snap ring 94 and also the friction between the rotating spindle 52, the guides 108 and the shaft 100. The rotation of the shaft 100 does not rotate the spring shaft 146 because of the ball bearing 138 and the shoulder screw and nylon bushing 156 in slot 158 as previously explained. As the head 10, continues to descend, the pressure pad 46 presses the lock frame 18 against the indexing table 14 to secure the frame 18 to the table 14 and in so doing maintains the lock frame 18 in the position with the tapped hole 20 therein over relief hole 16.

After the lock frame 18 is secure, the continued downward movement of the tapping head 10 moves the probe 68 through relief hole 48 to engage the threaded lower end 70 of the rotating probe 68 in the tapped hole 20. The spring 132 absorbs any shock resulting from this engagement and permits the probe 68 to halt temporarily until it picks up the threads in the tapped hole 20. The rotation of the probe 68 screws itself into the properly threaded hole 20. The head 10 continues to descend at the rate of descent of the tap but the probe 68 because it is rotating twice as fast as the tap descends into tapped hole 20 twice as fast producing a relative downward motion between the probe 68 and the head 10.

The relative downward motion between the probe 68 and the head 10, slides the shank 72 of probe 68 in the aperture 64 of the torque clutch 60, pulling the holder 88, the connecting shaft 100, the spring shaft 146 and the cam 180 downwardly relative the tapping head 10. As the spring shaft 146 moves downwardly, the lock nut 172 moves the upper washer 134 to compress the spring 132.

The relative downward movement of the cam 182 from the position shown in FIG. 1 to an intermediate position moves the wheel 178 from the lower cylindrical portion 186 onto the lobe 188 to close the micro switch 174.

Continued downward movement of the head 10 to a lowered position and continued rotation of probe 68 screws the probe 68 further into tapped hole 20 pulling the cam 180 down, moving wheel 178 off the lobe 188 onto the upper cylindrical portion 184 to open switch 174 again. As the switch 174 was closed during the lowering of the head 10, when the head 10 reaches the lowered position, the tapping machine reverses to raise the head 10 and to rotate the probe 68 in the opposite direction.

Rotation of the probe 68 in the opposite direction screws the probe 68 out of hole 20 at a rate twice the tap rate, raising cam 182 relative the head 10 and moving the wheel 178 from the upper cylindrical portion 184, over the lobe 188 and onto the lower cylindrical portion 186, to momentarily close switch 174. This relative motion also relieves the compression on spring 132. Again, as the switch 174 was closed during the raising of head 10, when the head 10 returns to the ready position of FIG. 1, with the pressure pad 46 raised, the tapping machine is ready to start another cycle.

The tapping machine will continue repeating its cycle until the probe encounters a missing hole, a small hole, a hole without threads, a tapped hole with tight threads or a large hole.

The operation of the tapped hole checking device is the same if a hole is missing, a hole is too small or a hole has no threads and so only one situation will be particularly described with the other situations being similar.

As the tapping head 10 is lowered from the position in FIG. 1 as previously described, the probe 68 also descends until it engages the lock frame 18 without a hole 18 therein. The head 10 continues to descend, but the probe 68 stops, compressing spring 132 through the engagement of the shoulder 164 with the lower washer 134. The cam 180 also stops while the head 10 descends so that the wheel 178 is moved from the position on the lower cylindrical portion 186 shown in FIG. 1 to a lower position on the lower cylindrical portion 186 without crossing the lobe 188. With the wheel 178 remaining on the same side of the lobe 188, the switch 174 is not closed and when the tapping head 10 reaches the lowered position, the machine reverses and returns to the ready position of FIG. 1 where it stops and shows the defective hole on the panel.

Suppose instead of no hole or a hole that is too small, there is a properly threaded hole but the tap is worn so that the threads are too tight to be usable or there is an obstruction in the threads, then the tapped hole checking device 50 operates thusly.

As the tapping head 10 is lowered from the position shown in FIG. 1, the rotating probe 68 also descends and screws into the tapped hole 20 as previously described. The probe 68 continues into the hole until the tight thread is encountered whereupon the tight thread frictionally holds the probe 68 from rotating and the torque clutch 60 slips enabling the spindle 52 to continue rotating while the probe 68 is held stationary. If the tight threads hold the probe 68 before the probe 68 has descended sufficiently to move the wheel 178 over the lobe 188 of the cam 180, the resulting operation of the tapping machine is exactly like the situation previously described with no hole in the frame 18. If however, the tight threads hold the probe 68 after the probe has descended a distance into the hole which is more likely because of the tapered lower end 70 of the probe 68, the probe 68 is held by the tight threads while the head 10 continues to descend until it reaches the lowered position. When the head 10 reaches the lowered position, it reverses because switch 174 was closed as the head 10 lowered, and starts to rise. As the head 10 rises from the lowered position to the ready position in FIG. 1, the wheel 78 runs on the upper cylindrical portion 184 of the cam 182 upwardly away from the lobe 188 so that the switch 174 is never closed. When the head 10 reaches the ready position of FIG. 1, the machine shuts off and again indicates which hole 20 is defective so that the operator can correct the situation.

The last situation involves a hole 20 in the lock frame 18 which is too large. When the probe 68 enters a hole 20 which is too large, the threads 70 of the probe 68 rotate freely but do not engage the threads in the tapped hole 20 to pull the probe 68 down relative to the head 10. Without the relative motion between the probe 68 and the head 10 the wheel 178 remains stationary on the cam 180 and never closes switch 174. Again, when the head 10 returns to the raised position of FIG. 1, the machine shuts off and indicates the defective hole 20.

If for any reason a lock frame is omitted from a particular checking position, the machine operates exactly as if a frame 18 with too large a hole 20 was encountered. If this is to be done consistently, an automatic override should be provided to compensate for the missing frame 18.

It should be noted that while the tapped hole checking device was mounted on a reciprocating tapping head of a tapping machine, it could also be mounted on any support to produce a reciprocal motion between the probe 68 and the support. Also, this relative motion could operate a variety of indicators or controls as desired.

Thus, the tapped hole checking device of this invention automatically checks tapped holes in mass production parts.

We claim:

1. A tapped hole checking device for checking for a defectively tapped hole in a part adapted to be fixed with respect to the checking device which comprises, a probe with a threaded end for threaded engagement with a properly tapped hole in the part, means adapted to mount the probe on a reciprocating support for rotational movement relative to the support and the part and for predetermined reciprocal movement of the rotating probe relative the support in response to threaded engagement of the rotating probe with a properly tapped hole in the art during reciprocation of the support, and control means responsive to the predetermined reciprocal movement of the probe relative the support to indicate a properly tapped hole, the control means being responsive to a lack of the predetermined reciprocal movement of the rotating probe relative the support to indicate a defectively tapped hole.

2. A tapped hole checking device for checking for a defectively tapped hole in a part adapted to be fixed with respect to the checking device which comprises, a probe with a threaded end for threaded engagement with a properly tapped hole in the part, means adapted to mount the probe on the reciproctaing tapping head of a tapping machine for rotational movement relative to the tapping head and the part and for predetermined reciprocal movement of the rotating probe relative the tapping head in response to threaded engagement of the rotating probe with a properly tapped hole in the part during reciprocation of the tapping head, and control means responsive to the predetermined reciprocal movement of the probe relative the tapping head to indicate a properly tapped hole, the control means being responsive to the lack of the predetermined reciprocal movement of the probe relative the tapping head to indicate a defectively tapped hole.

3. A tapped hole checking device for checking for a defectively tapped hole in a part adapted to be fixed with respect to the checking device which comprises, a probe with a threaded end for threaded engagement with a properly tapped hole in the part, means adapted to mount the probe on the reciprocating tapping head of a tapping machine for rotational movement relative the part and for predetermined reciprocal movement of the rotating probe relative the tapping head in response to threaded engagement of the rotating probe with a properly tapped hole in the part during reciprocation of the tapping head, and control means including a cam and follower responsive to the predetermined reciprocal movement of the probe relative the reciprocating tapping head to indicate a properly tapped hole, the cam and follower being responsive to the lack of the predetermined reciprocal movement of the probe relative the reciprocating tapping head such that the control means indicates a defectively tapped hole.

4. The tapped hole checking device of claim 3 wherein the means adapted to mount the probe on the reciprocating tapping head includes a torque clutch means which slips upon threaded engagement of the probe with a defectively tapped hole to halt the relative rotation of the probe and prevent the predetermined reciprocal movement of the probe relative the reciprocating tapping head.

References Cited

UNITED STATES PATENTS

| | | | |
|---|---|---|---|
| 1,403,170 | 1/1922 | Kind | 10—136.5 |
| 1,911,138 | 5/1933 | Clute et al. | 33—199 |
| 1,940,783 | 12/1933 | Adams | 33—199 |
| 1,979,731 | 11/1934 | Burge et al. | 33—199 |
| 2,074,470 | 3/1937 | Herrmann | 10—129 |
| 2,380,841 | 7/1945 | Heckethorn | 33—199 |
| 2,845,639 | 1/1958 | Jorgensen et al. | 10—136.5 |
| 2,104,435 | 1/1938 | Noel | 10—129 |
| 2,551,551 | 5/1951 | Sprague | 10—135 |
| 2,521,479 | 9/1950 | Rautter | 10—135 |

CHARLES W. LANHAM, Primary Examiner

E. M. COMBS, Assistant Examiner

U.S. Cl. X.R.

33—199